United States Patent
Vollmer et al.

(12) 
(10) Patent No.: US 6,377,728 B1
(45) Date of Patent: Apr. 23, 2002

(54) PACKAGING FOR GRATING-BASED WDM ROUTER

(75) Inventors: Hubert Joachim Vollmer; Kenneth John Bystrom, both of Tracy; Olga Gorbounova, Santa Clara; Simon X. F. Cao, Pleasanton, all of CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/579,208

(22) Filed: May 25, 2000

(51) Int. Cl.[7] .................................................. G02B 6/34
(52) U.S. Cl. .............................. 385/37; 385/52; 385/37; 385/56; 359/566; 359/130
(58) Field of Search .............................. 385/37, 51, 24, 385/52; 359/127, 124, 130, 566; 439/700, 824

(56) References Cited

FOREIGN PATENT DOCUMENTS

DE          0123237      *  4/1984  ............ G02B/7/26

* cited by examiner

Primary Examiner—Cassandra Spyrou
Assistant Examiner—Christopher S. Maxie
(74) Attorney, Agent, or Firm—Sawyer Law Group LLP

(57) ABSTRACT

The present invention provides a package for a wavelength division multiplexer (WDM). The package includes a grating comprising an alignment surface; a first sleeve comprising a mount, the mount capable of contacting the grating; and an alignment plate coupled to an outer surface of the first sleeve, where the alignment plate is capable of contacting the alignment surface of the grating. The preferred embodiment of the package also includes a second sleeve with a holding mechanism in contact with the grating. This packaging affords a quick, easy, precise and reproducible positioning and alignment of grating. Thus, the WDM is minimized in size while also reproducibly assembled with perfect alignment in a minimal amount of time.

35 Claims, 12 Drawing Sheets

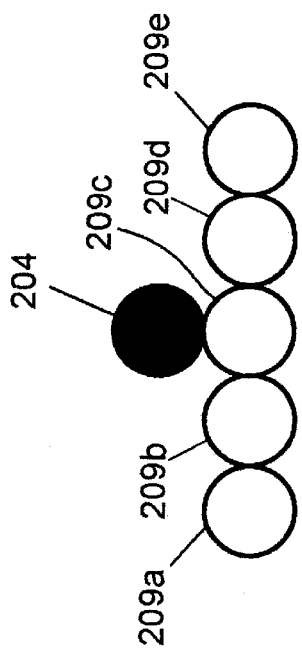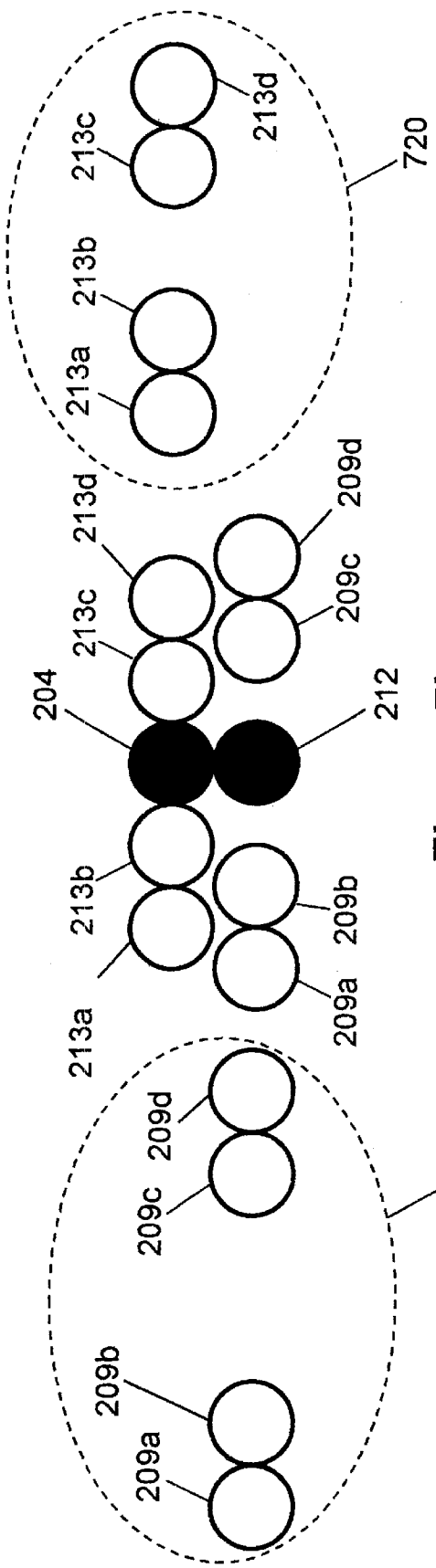

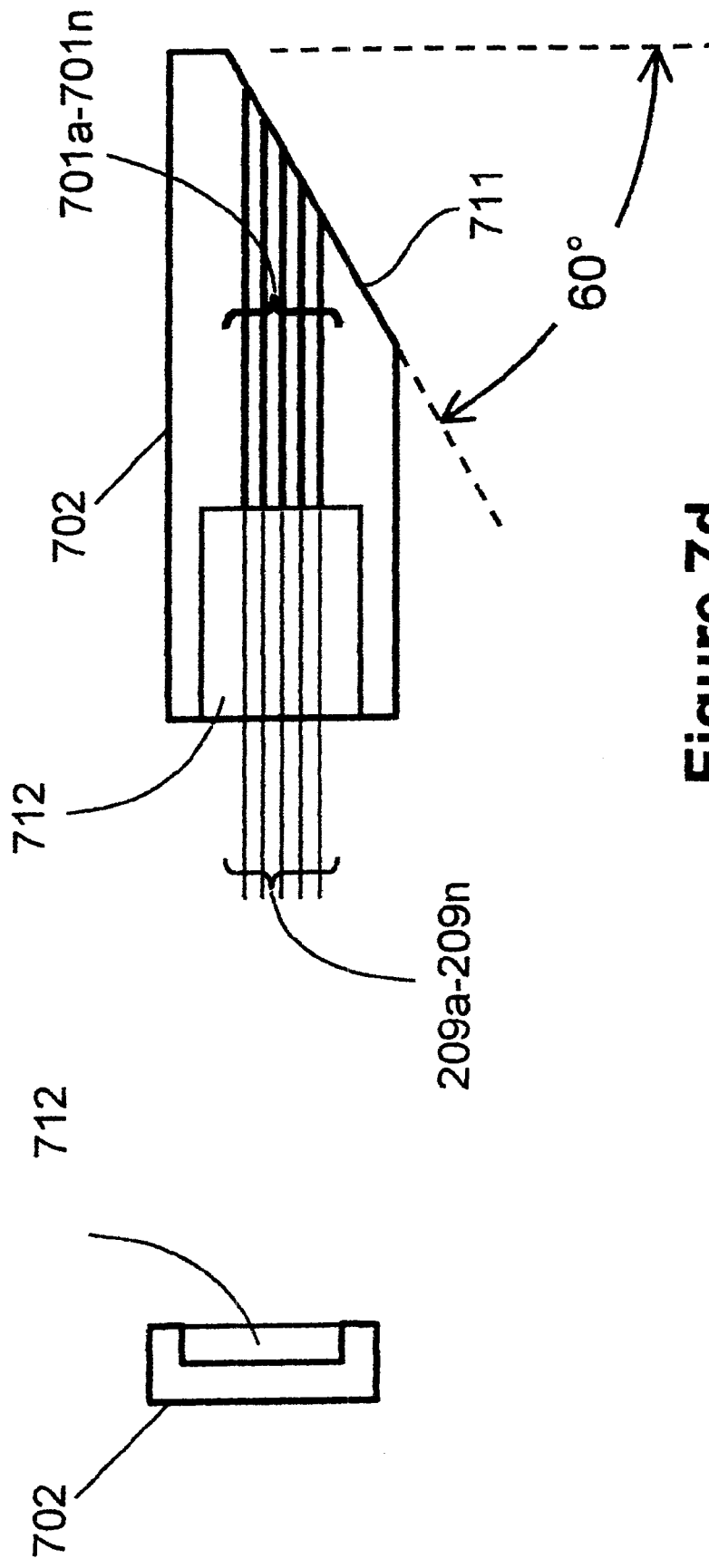

US 6,377,728 B1

PACKAGING FOR GRATING-BASED WDM ROUTER

FIELD OF THE INVENTION

The present invention relates to wavelength division multiplexers and demultiplexers in optical communications networks and systems, and more particularly to their packaging.

BACKGROUND OF THE INVENTION

Fiber optic communication systems are becoming increasingly popular for data transmission due to their high speed and high data capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this document, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

The term "wavelength," denoted by the Greek letter $\lambda$ (lambda) is used herein in two senses. In the first usage, this term is used according to its common meaning to refer to the actual physical length comprising one fall period of electromagnetic oscillation of a light ray or light beam. In its second usage, the term "wavelength" is used synonymously with the terms "signal" or "channel." Although each information-carrying channel actually comprises light of a certain range of physical Wavelengths, for simplicity, a single channel is referred to as a single wavelength, $\lambda$, and a plurality of n such channels are referred to as "n wavelengths" denoted $\lambda_1 - \lambda_n$. Used in this sense, the term "wavelength" may be understood to refer to "the channel nominally comprised of light of a range of physical wavelengths centered at the particular wavelength, $\lambda$."

A crucial feature of fiber optic networks is the separation of the composite optical signal into its component wavelengths or channels, typically by a wavelength division multiplexer. This separation must occur to allow for the exchange of signals between loops within optical communications networks. The exchange typically occurs at connector points, or points where two or more loops intersect for the purpose of exchanging wavelengths.

FIG. 1a schematically illustrates one form of an add/drop system, which typically exists at connector points for the management of the channel exchanges. The exchanging of data signals involves the exchanging of matching wavelengths from two different loops within an optical network. In other words, each composite optical signal drops a channel to the other loop while simultaneously adding the matching channel from the other loop.

A wavelength division multiplexer (WDM) typically performs separation of a composite optical signal into component channels in an add/drop system. Used in its reverse sense, the same WDM can combine different channels, of different wavelengths, into a single composite optical signal. In the first instance, this WDM is strictly utilized as a de-multiplexer and, in the second instance, it is utilized as a multiplexer. However, the term "multiplexer" is typically used to refer to such an apparatus, regardless of the "direction" in which it is utilized.

FIG. 1a illustrates add/drop systems 218 and 219 utilizing wavelength division multiplexers 220 and 230. A composite optical signal from Loop 110 ($\lambda_1 - \lambda_n$) enters its add/drop system 218 at node A (240). The composite optical signal is separated into its component channels by the WDM 220. Each channel is then outputted to its own path 250-1 through 250-n. For example, $\lambda_1$ would travel along path 250-1, $\lambda_2$ would travel along path 250-2, etc. In the same manner, the composite optical signal from Loop 150 ($\lambda_1' - \lambda_n'$) enters its add/drop system 219 via node C (270). The signal is separated into its component channels by the WDM 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred from path 250-1 to path 280-1. It is combined with the others of Loop 150's channels into a single new composite optical signal by the WDM 230. The new signal is then returned to Loop 150 via node D 290. At the same time, $\lambda_1'$ is transferred from path 280-1 to path 250-1. It is combined with the others of Loop 110's channels into a single new composite optical signal by the WDM 220. This new signal is then returned to Loop 110 via node B (260). In this manner, from Loop 110's frame of reference, channel $\lambda_1$ of its own signal is dropped to Loop 150 while channel $\lambda_1'$ of the signal from Loop 150 is added to form part of its new signal. This is the add/drop function.

FIG. 1b illustrates a second form by which add/drop systems 218 and 219 may be configured. In FIG. 1b, each WDM is optically coupled to a first plurality of paths through which channels are outputted and to a second plurality of paths through which signals are inputted. For instance, the paths 250-1, 250-2, . . . , 250-n are utilized to output signals comprising wavelengths $\lambda_1, \lambda_2, \ldots, \lambda_n$, respectively, from the WDM 220 and the paths 251-1, 251-2, . . . , 251-n are utilized to input signals comprising such wavelengths to the WDM 220. Likewise, as shown in FIG. 1b, the paths 280-1, 280-2, . . . , 280-n are utilized to output signals $\lambda_1', \lambda_2', \ldots, \lambda_n'$ (comprising the physical wavelengths $\lambda_1, \lambda_2, \ldots, \lambda_n$) respectively, from the WDM 230 and the paths 281-1, 281-2, . . . , 281-n are utilized to input signals comprising such wavelengths to the WDM 230.

FIGS. 2a and 2b illustrate a top view and side view, respectively, of a prior-art grating-based WDM. In the WDM 200, a concave reflection-type holographic grating 202 is disposed upon a substrate plate or block 201 comprised of a material with low thermal expansion. The grating 202, which comprises a portion of a spherical surface 206 centered at point 210, receives a wavelength-division multiplexed composite optical signal 211 input to the WDM 200 from an input fiber 204. The composite optical signal 211 is comprised of a plurality of individual channels, $\lambda_1, \lambda_2, \ldots$ The concave grating 202 diffracts, reflects, focuses and spatially disperses each of these individual channels according to its respective wavelength such that each channel is directed to exactly one of a plurality of output fibers 209a–209b. For instance, referring to FIG. 2a, if input signal 201 is comprised of two channels, namely channel $\lambda_1$ (207a) and channel $\lambda_2$ (207b), with $\lambda_1 < \lambda_2$, then, upon back-diffraction from grating 202, the $\lambda_1$ channel (207a) and the $\lambda_2$ channel (207b) are focused onto the end of fiber 209a and fiber 209b, respectively.

The input fiber 204 and the plurality of output fibers 209a–209c are disposed within an array 205 of fibers. The end faces of the fibers in array 205 are disposed along or parallel to a plane 208 which makes an angle of 60° with the line 203 that is normal to the grating 202 at the center of the grating 202. With this disposition, the grating 202 diffracts light according to the Littrow configuration, in which the angles of incidence and diffraction are approximately equal. FIG. 2b shows a side view of the prior art apparatus taken parallel to the fiber 204. FIG. 2b shows that the fibers are directed towards the grating vertex and are at an angle to the grating dispersion plane 215. The input fiber 204 and the output fibers 209a–209c each make the same angle φ (taken without regard to algebraic sign) with respect to the dispersion plane 215 and the input fiber 204 makes an angle of 2φ with respect to the plane of the output fibers. With channels spaced at 0.33 nm, fiber-to-fiber losses the grating-based WDM router 200 can be maintained at less than 1 dB and ultra-low crosstalk can be maintained.

For use in commercial optical communications systems, the WDM's packaging must be configured such that the size of the apparatus is minimized while also such that the apparatus can be reproducibly assembled with perfect alignment in a minimal amount of time. Furthermore, the device must be packaged or mounted in such a fashion that there is minimal temperature sensitivity. These conditions are problematic since, not only must the grating be positioned precisely with respect to the input and output optical fibers, but also must the angle of the fibers relative to the grating surface and the rotation of the grating surface about its optical axis be precisely and accurately controlled. Slight mis-alignment of the grating and the fibers or of the tilt or rotation of the grating can lead to severe insertion loss and cross talk penalties.

Accordingly, there exists a need for an improved packaging for a grating-based wavelength division multiplexer. The packaging should afford quick, easy, precise, and reproducible positioning and alignment of the grating in the WDM. The present invention addresses such a need.

SUMMARY OF THE INVENTION

The present invention provides a package for a wavelength division multiplexer (WDM). The package includes a grating comprising an alignment surface; a first sleeve comprising a mount, the mount capable of contacting the grating; and an alignment plate coupled to an outer surface of the first sleeve, where the alignment plate is capable of contacting the alignment surface of the grating. The preferred embodiment of the package also includes a second sleeve with a holding mechanism in contact with the grating. This packaging affords a quick, easy, precise and reproducible positioning and alignment of grating. Thus, the WDM is minimized in size while also reproducibly assembled with perfect alignment in a minimal amount of time.

BRIEF DESCRIPTION OF THE FIGURES

FIGS. 7a and 7b illustrate end views of input and output fibers in two possible configurations of a fiber array of the WDM in accordance with the present invention.

FIG. 7d illustrates an end view and a side view of the fiber alignment block in the packaging of the WDM in accordance with the present invention.

DETAILED DESCRIPTION

The present invention provides an improved packaging for a grating-based wavelength division multiplexer (WDM). The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A preferred embodiment of a packaging for a grating-based WDM in accordance with the present invention comprises a concave holographic reflection grating with an alignment surface, a first hollow sleeve or cylinder with a mount for contacting the concave holographic reflecting grating and alignment surface, a pin or plate to align the alignment surfaces of the grating and the first hollow sleeve or cylinder, and a second hollow sleeve or cylinder with a spring-loaded holding mechanism in contact with the back side of the grating substrate. To more particularly describe the features of the present invention, please refer to FIGS. 3 through 7e in conjunction with the discussion below.

Figure 3:
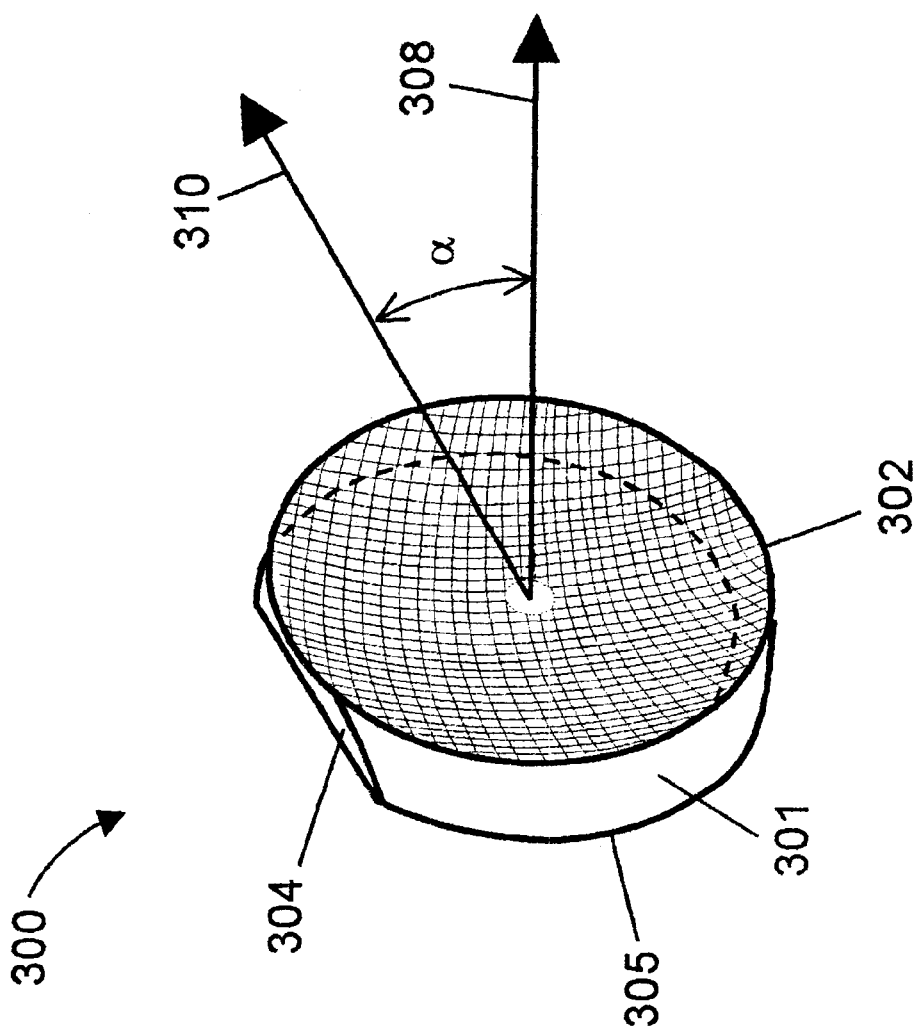
FIG. 3 illustrates, in perspective view, a concave holographic grating block in a packaging of a WDM in accordance with the present invention.

FIG. 3 illustrates, in perspective view, a concave holographic grating block in a packaging of a WDM in accordance with the present invention. The grating block 300 comprises a diffraction grating 302 disposed on the concave surface of a substrate plate 301. The grating 302 comprises a reflective concave surface or film in the geometric form of a spherical cap. The substrate 301 is preferably comprised of a low-thermal-expansion substrate such as Zerodur® glass (manufactured by Schott Glass Technologies, Inc. of Duryea Pa. USA) or ULE® glass (manufactured by Corning, Inc. of Corning N.Y. USA).

The grating axis 308 is perpendicular to the chord to spherical cap grating surface 302 at the center of this surface. The back surface 305 of substrate plate 301 is opposite to the grating surface 302 and is utilized to accept force from a pressure mechanism as described further below. In a preferred embodiment, the back surface 305 is substantially flat and substantially perpendicular to the grating axis 308, although this need not be the case. An additional flat alignment surface 304 is formed or cut within substrate plate 301 at an oblique angle with respect to the plane comprising the chord to the concave spherical cap grating surface 302.

A plurality of holographically formed grooves or Bragg diffraction surfaces is disposed upon or within the grating 302. The grooves or Bragg surfaces comprise the light scattering elements of grating 302 and represent an interference fringe pattern produced using the well-known technique of holography. The grooves or Bragg surfaces of grating 302 are disposed such that the grating 302 operates in the Littrow configuration—that is, such that light rays delivered to the grating 302 and light rays diffracted from the grating 302 are substantially parallel to a single axis 310 disposed at a particular angle α to the grating axis. In a preferred embodiment, the angle α is equal to 30°. Additionally, the surface 302 is optically reflective and is concave so that signal rays are focused after diffracting therefrom.

Figure 4:
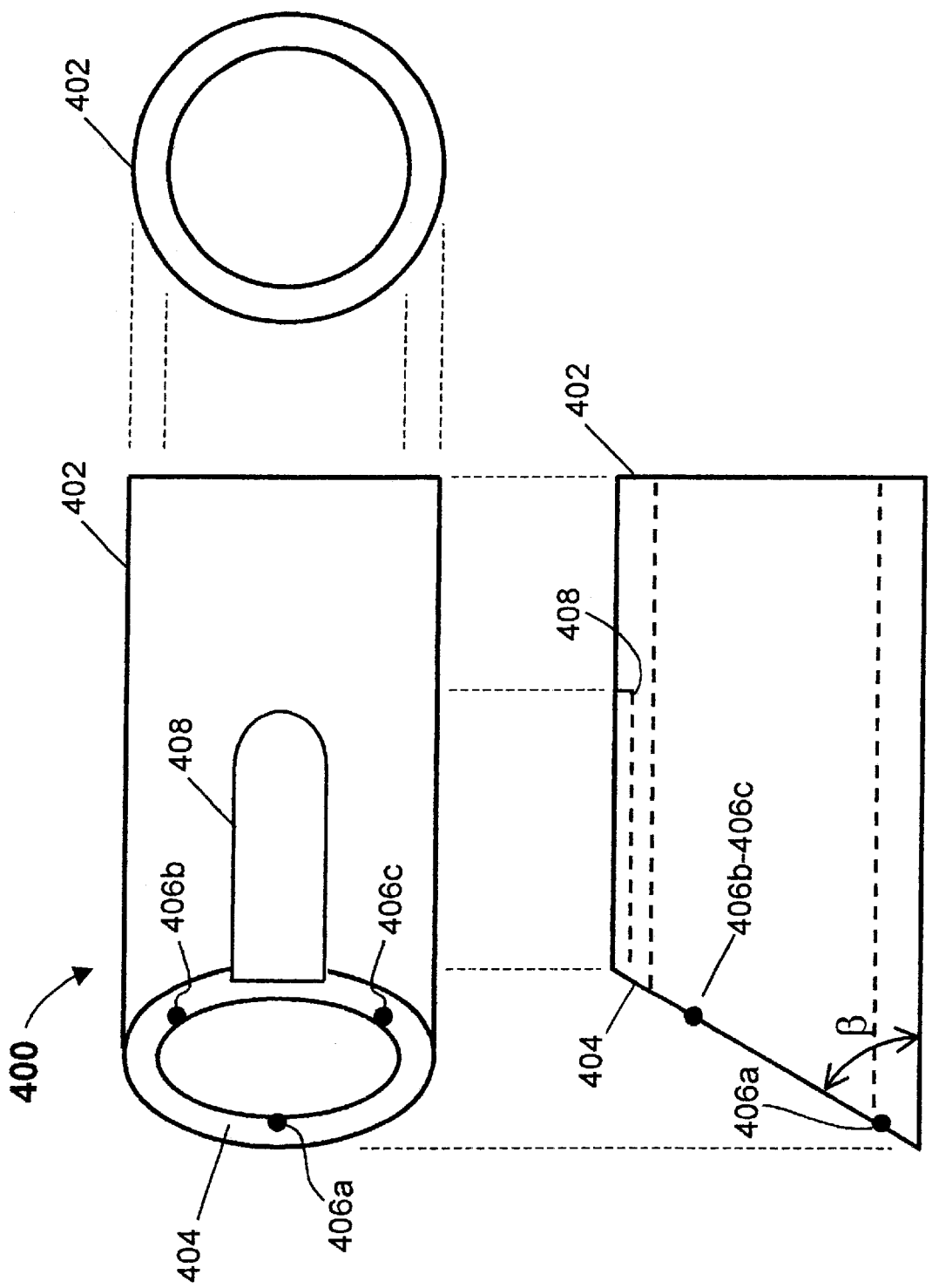
FIG. 4 illustrates a grating mounting block utilized in conjunction with the concave holographic grating in the packaging of the WDM in accordance with the present invention.

FIG. 4 illustrates a grating mounting block utilized in conjunction with the concave holographic grating in the packaging of the WDM in accordance with the present invention. The mounting block 400 comprises a hollow rod 402 of a low-thermal-expansion material such as Zerodur® or ULE® glass. The rod 402 is cylindrical in cross section, although this need not be the case. A slanted surface 404 is cut or formed at one end of rod 402 and carries a plurality of rounded mounting pins or mounting balls 406a–406c. In the preferred embodiment, three mounting pins are used. The slant angle β that the surface 404 makes with the axis of the rod 402 is substantially equal to the complement of the angle of incidence of input signal light rays delivered to the grating 302 in Littrow configuration. In the preferred embodiment, the angle β is 60°. Further, a groove or slot 408 is cut or formed on the outer side surface of hollow rod 402.

Figure 5:
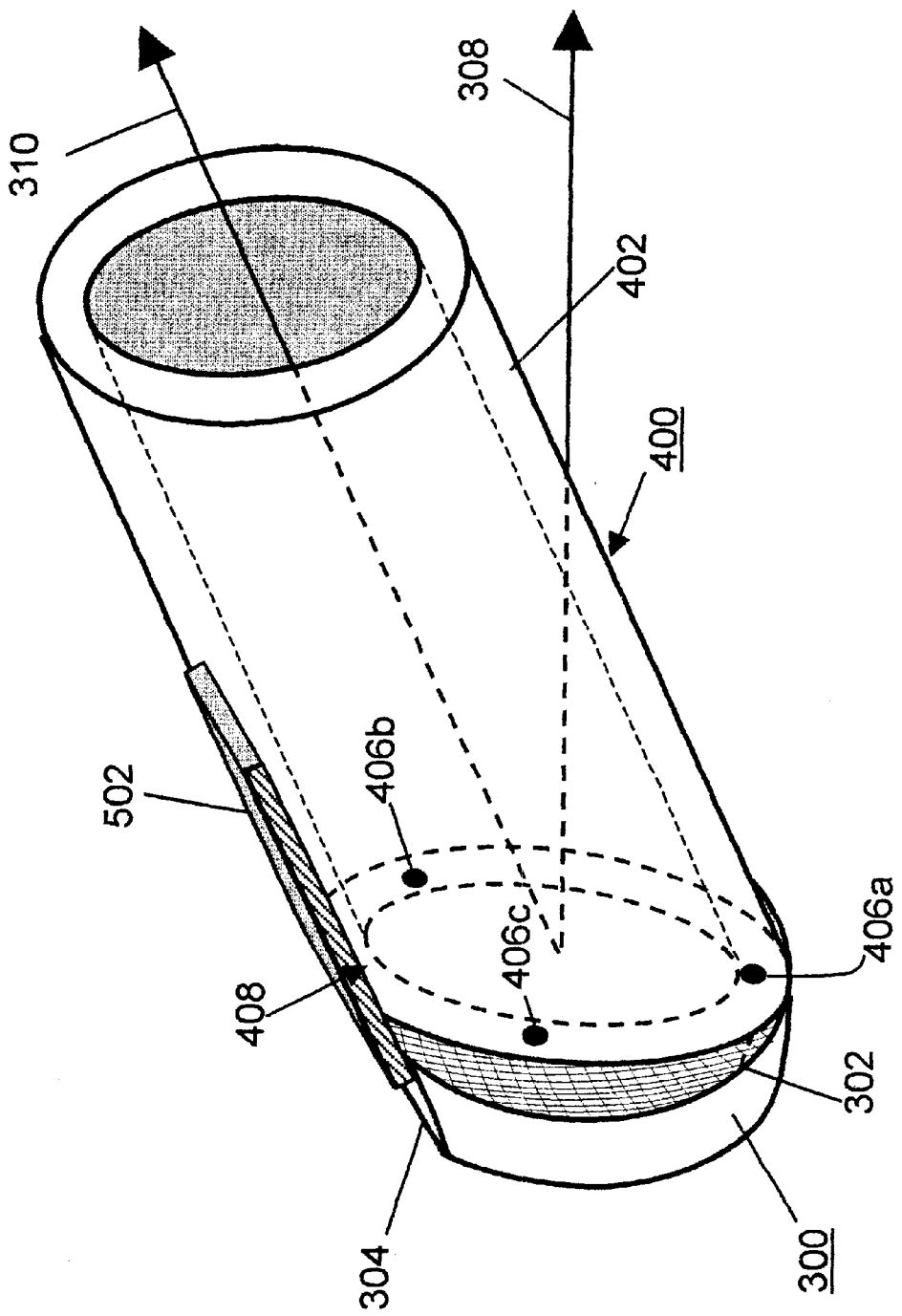
FIG. 5 illustrates a perspective view of a concave holographic grating disposed adjacent to a grating mounting block in the packaging of the WDM in accordance with the present invention.

FIG. 5 illustrates a perspective view of a concave holographic grating disposed adjacent to a grating mounting block in the packaging of the WDM in accordance with the present invention. The three rounded mounting pins or mounting balls 406a–406c comprise the sole contact points between the grating surface 302 and the mounting block 400. With grating block 300 positioned against the mounting block 400, the axis or long direction of hollow rod 402 is aligned substantially parallel to the Littrow axis 310 as shown in FIG. 5. Since the grating surface 302 is spherical and the grooves or Bragg surfaces within grating 302 are substantially parallel, the required precision of the lateral alignment between surface 302 and the three mounting pins or balls 406a–406c is not great. However, the rotational alignment of grating 302 about its axis 308 must be strictly controlled. For this reason, a rotational alignment pin or plate 502 is disposed so as to contact both the alignment surface 304 of grating block 300 and the groove or slot 408 of hollow rod 402. The rotational alignment pin or plate 502 locks the rotational alignment of grating surface 302 such that the Littrow axis 310 is substantially parallel to the long axis of hollow rod 402.

During device assembly, the alignment pin or plate 502 is secured to rod 402 by adhesive, epoxy, solder, or the like. Subsequently, the grating block 300 is positioned such that grating surface 302 firmly contacts the three mounting pins or balls 406a–406c while, simultaneously, the flat surface 304 contacts the alignment pin or plate 502.

Figure 6:
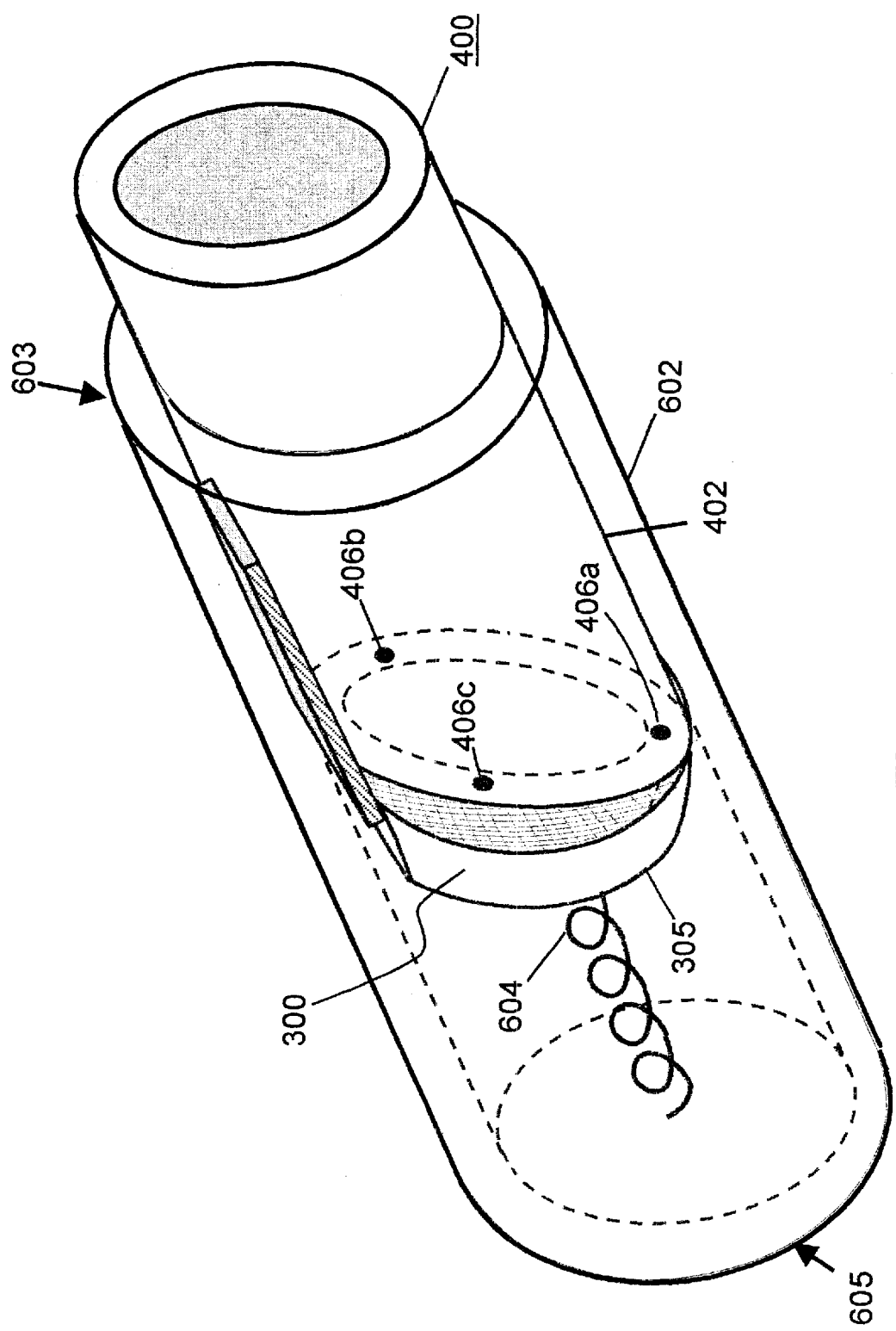
FIG. 6 illustrates further details of the assembly and alignment of the grating block within the packaging of the WDM in accordance with the present invention.

FIG. 6 illustrates further details of the assembly and alignment of the grating block within the packaging of the WDM in accordance with the present invention. The grating block 300 is housed within an outer protective tube or sleeve 602. The tube or sleeve 602 is open only at its front end 603 and is sealed at its back end 605. For clarity of presentation, the tube or sleeve 602 is shown as transparent in FIG. 6 so as to reveal the disposition of the components inside. The inner diameter of the protective tube or sleeve 602 is large enough to fit over at least a portion of the hollow rod 402. A holding mechanism 604 housed within the protective tube or sleeve 602 applies force to the back face 305 of grating block 300. In the preferred embodiment, the holding mechanism 604 is spring-loaded. This force is such that, when sleeve 602 is fitted over rod 402, the spring mechanism 604 forces the grating block 300 into its proper alignment against the pins or balls 406a–406c and the alignment pin or plate 502. Thus, the positioning mechanism illustrated in FIG. 5 and FIG. 6 affords quick, easy, precise and reproducible positioning and alignment of grating block 300.

FIGS. 7a and 7b illustrate end views of input and output fibers in two possible configurations of a fiber array of the WDM in accordance with the present invention. FIG. 7a and 7b respectively illustrate a single planar array and a double planar array configuration of the fibers comprising fiber array 205. In both FIG. 7a and FIG. 7b, fiber 204 is an input/output fiber that carries, either as input or output, a wavelength division multiplexed composite optical signal and fibers 209a–209e are a plurality of output/input fibers wherein each such fiber carries, either as output or input, a single signal comprising an individual wavelength. In FIG. 7b, fiber 212 is a second input/output fiber corresponding to fiber 204 and fibers 213a–213d are a second plurality of output/input fibers corresponding to the set 209a–209d.

Figure 1A:
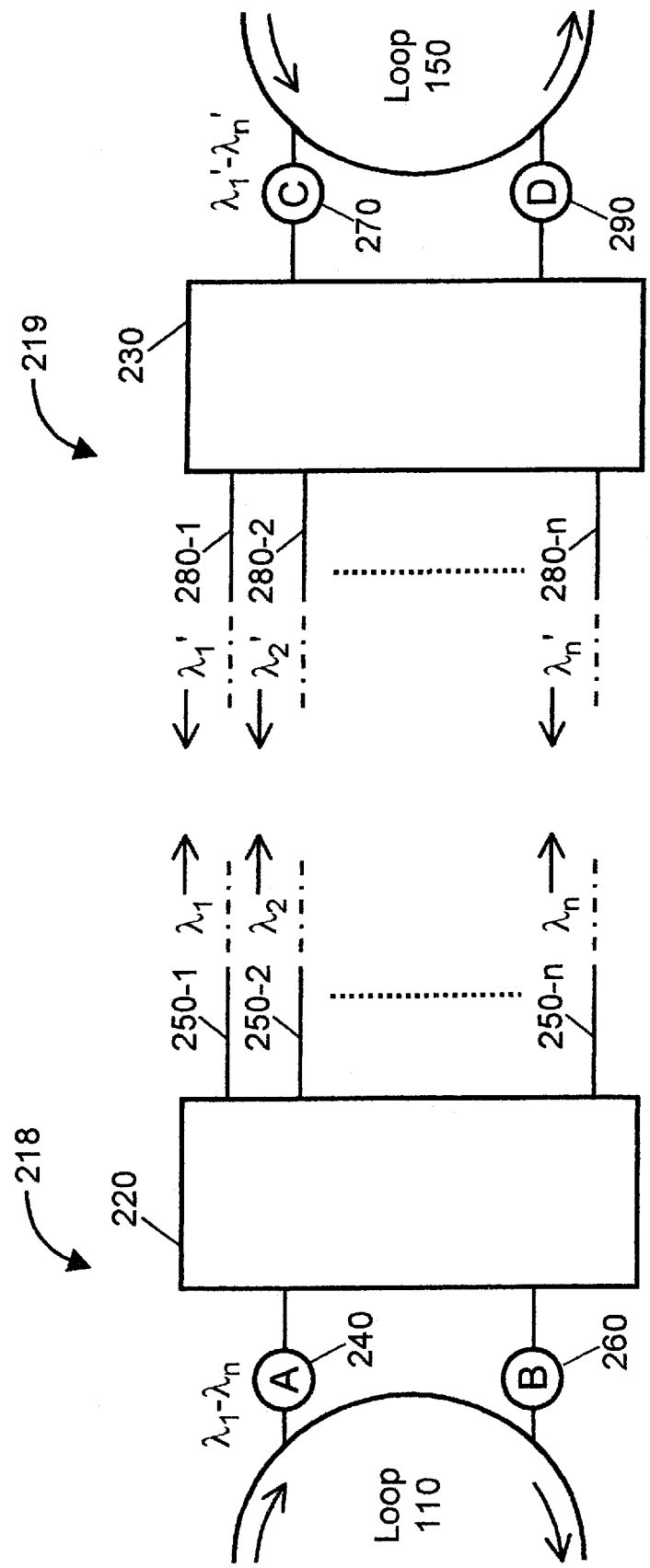
FIG. 1a and FIG. 1b illustrate two configurations of conventional add/drop systems utilizing wavelength division multiplexers.
Figure 1B:
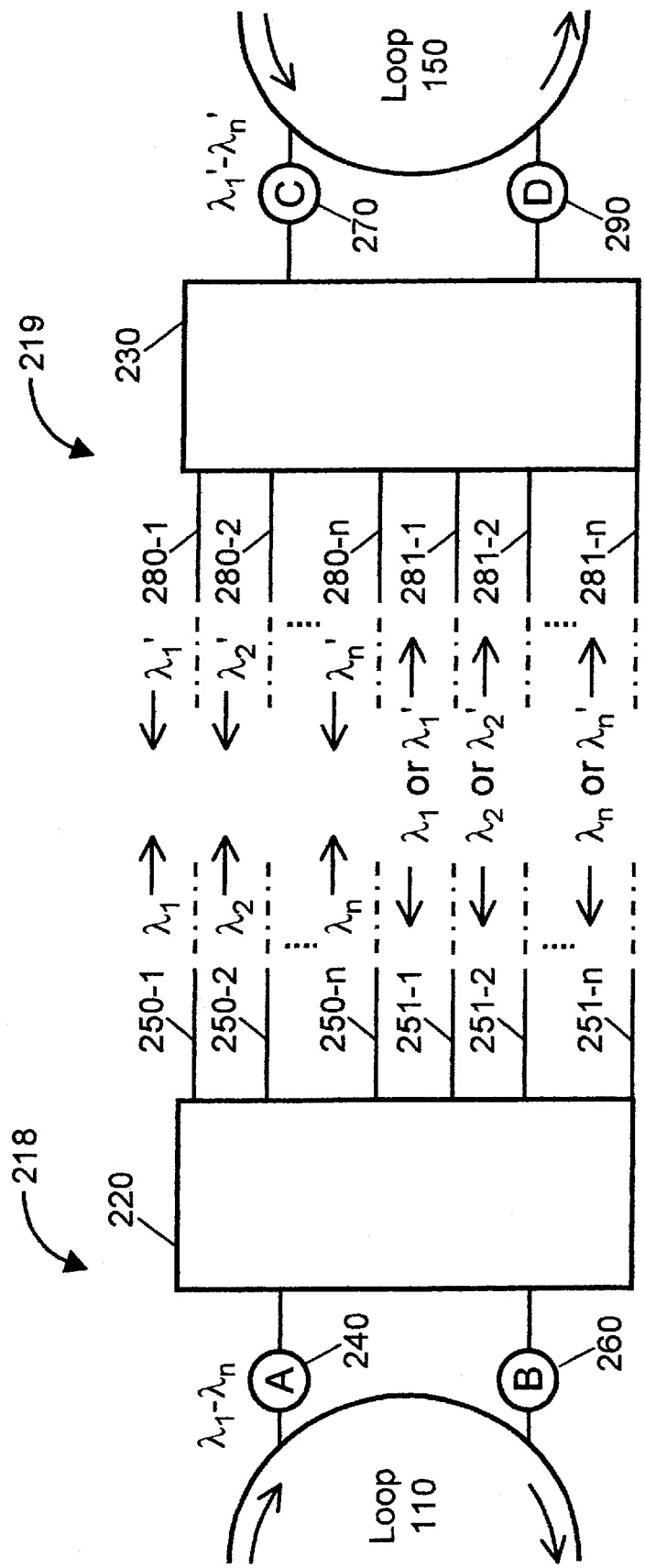
Figure 2A:
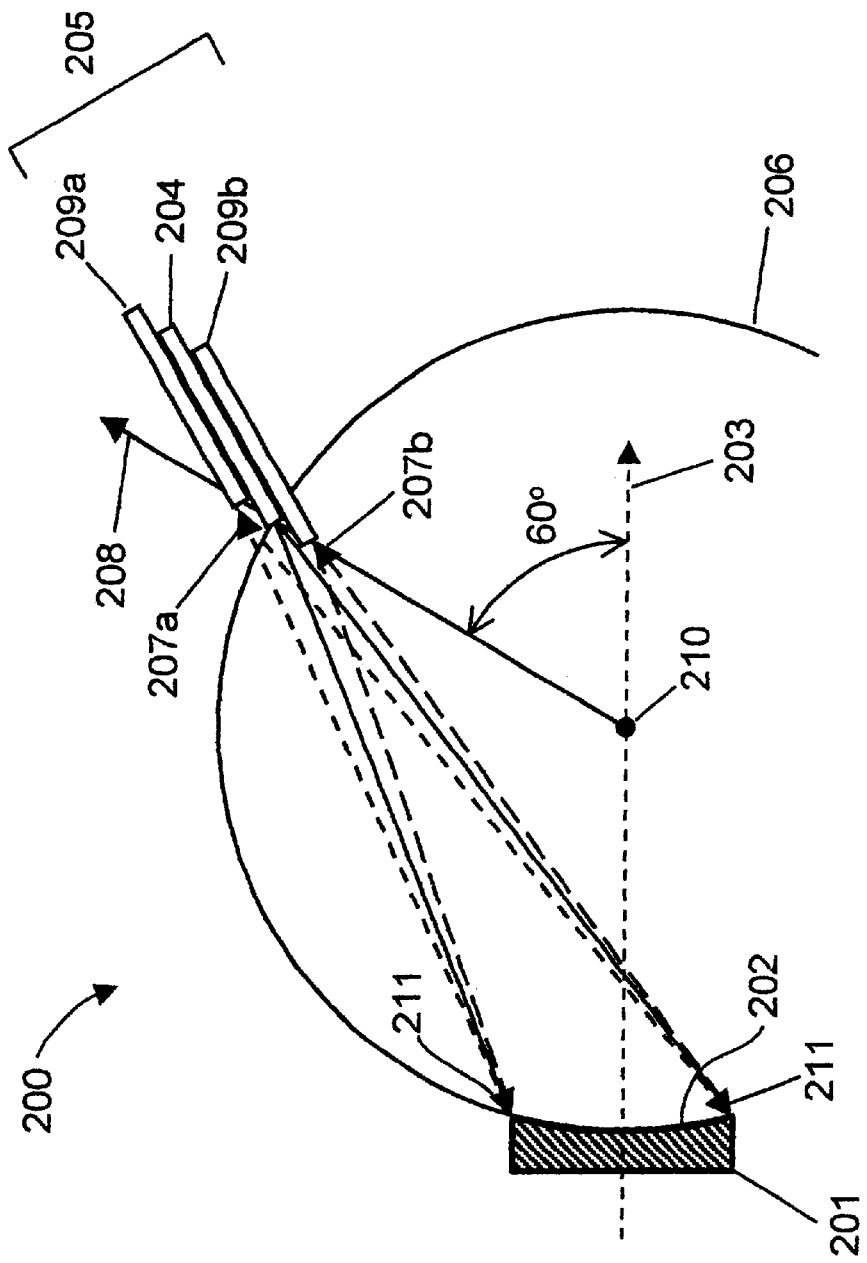
FIGS. 2a and 2b illustrate a top and a side view, respectively, of a prior-art grating-based WDM employing a concave holographic grating in stationary anastigmatic Littrow configuration.

In the single planar array embodiment shown in FIG. 7a, the fibers 209a–209e are all disposed within a plane that is at an angle φ (≧0) with respect to the dispersion plane of grating 302 and the fiber 204 is to the opposite side of the dispersion plane and is disposed at an angle of −φ (≦0) with respect to the dispersion plane. In the double planar array embodiment shown in FIG. 7b, the fibers 204, 213a–213d are all disposed within a first plane, and the fibers 212, 209a–209d are all disposed within a second plane wherein the second and first planes are disposed at an angle φ (≧0) and at an angle −φ(≦0) to the grating dispersion plane, respectively. The centers of the end faces of all fibers are disposed within the plane 208 (FIG. 2a) in either the single or double planar array configuration. The spacings between fibers within either the first or second plane need not be regular, and the inter-fiber spacings within the first plane need not be the same as those within the second plane. The fibers 209a–209d comprise a first set 710 of output/input fibers and the fibers 213a–213d comprise a second set 720 of output/input fibers.

When the WDM in accordance with the present invention is operated as a de-multiplexer with respect to a composite optical signal on input/output fiber 204, a wavelength division multiplexed composite optical signal is input to the WDM through input/output fiber 204, the composite optical signal is separated into its individual component signals by the grating 302, the separated signals are spatially dispersed by the grating 302 according to their respective wavelengths, and each individual signal is directed and focused onto a different respective fiber of the plurality of output/input fibers 209a, 209b, 209c . . . The individual signals are then output from the WDM along respective individual output/input fibers of the set 209a, 209b, 209c . . . When the WDM is operated as a multiplexer with respect to signals on output/input fibers 209a, 209b, 209c . . . individual signals are input to the WDM from respective individual fibers of the plurality of output/input fibers 209a, 209b, 209c . . . , the signals are diffracted by the grating 302 along a single direction so as to be combined into a single composite optical signal and the composite optical signal is focused onto the end of the input/output fiber 204 so as to be output from the WDM therein.

Likewise, when the WDM in accordance with the present invention is operated as a de-multiplexer with respect to a composite optical signal on input/output fiber 212, a wavelength division multiplexed composite optical signal is input to the grating 302 through input/output fiber 212, the composite optical signal is separated into its individual component signals by the grating 302, the separated signals are spatially dispersed by the grating 302 according to their respective wavelengths, and each individual signal is directed and focused onto a different respective fiber of the plurality of output/input fibers 213a, 213b, 213c . . . The individual signals are then output from the WDM along respective individual output/input fibers of the set 213a, 213b, 213c . . . When the WDM is operated as a multiplexer with respect to signals on the output/input fibers 213a, 213b, 213c . . . , individual signals are input to the WDM from respective individual fibers of the plurality of output/input fibers 213a, 213b, 213c . . . , the signals are diffracted by the grating 302 along a single direction so as to be combined into a single composite optical signal and the composite optical signal is focused onto the end of the input/output fiber 212 so as to be output from the WDM therein.

The embodiments of the WDM in accordance with the present invention associated with the double planar array illustrated in FIG. 7b have the advantage that the WDM may be utilized as a de-multiplexer with respect to one set of fibers (e.g., fibers 204, 209a, 209b, 209c, etc.) simultaneously while it is being utilized as a multiplexer with respect to the second set of fibers (e.g., 212, 213a, 213b, 213c, etc.) and vice versa. Also, both sets of fibers may be used simultaneously in either the multiplexer or the de-multiplexer configuration. These simultaneous arrangements are permitted because each set of fibers can perform the multiplexing or de-multiplexing function essentially independently of the other set of fibers as a result of the extremely low inter-fiber cross-talk characteristics of the apparatus.

Figure 2B:
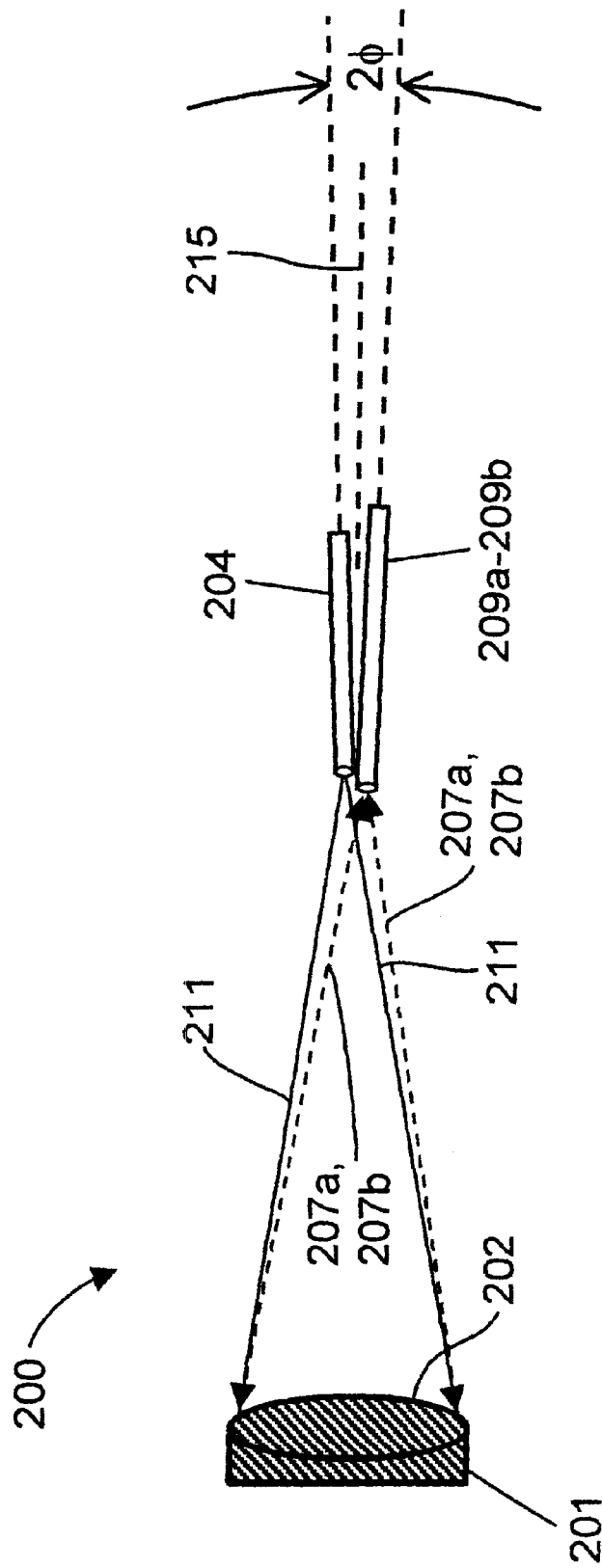
Figure 7C:
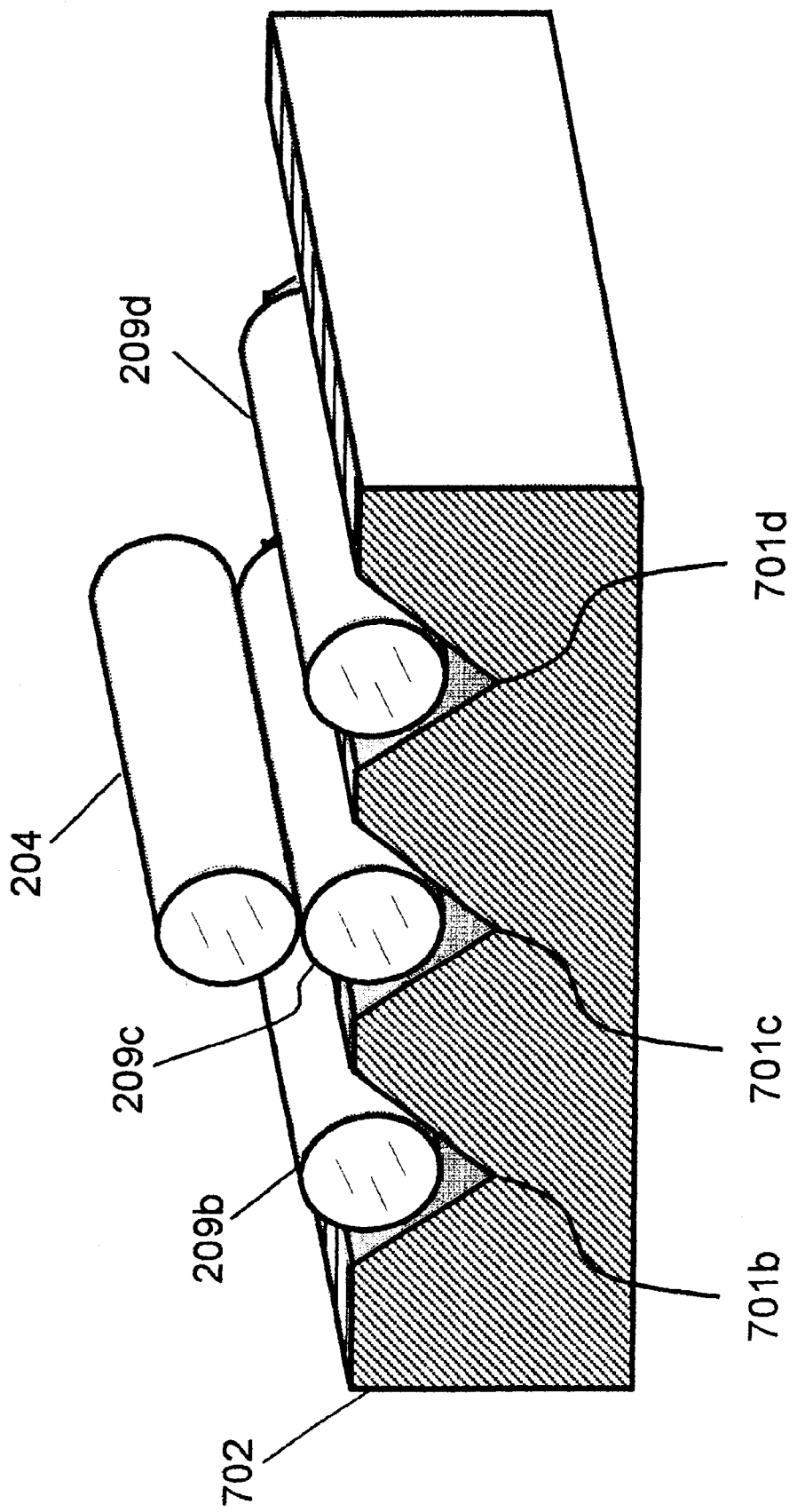
FIG. 7c illustrates the precise alignment of fibers in the single planar array configuration of the packaging in the WDM in accordance with the present invention.

FIG. 7c illustrates the precise alignment of fibers in the single planar array configuration in the packaging of the WDM in accordance with the present invention. The fibers 209b–209d are disposed within a set of V-grooves 701b–701d, pre-cut or pre-formed within a face of the fiber alignment block 702. Preferably, the alignment block 702 is fabricated from silicon and the V-grooves 701b–701d are formed by well-known photolithographic masking and etching processes. The fiber 204 is disposed out of the plane of the set of fibers 209b–209d and is held securely in place by either an opposing pressure plate, by a set of adjacent non-light transmitting fibers, or by some other securing mechanism (not shown). The long axis of fiber 204, in general, makes an angle of $2\phi$ with respect to that of the fiber with which it is in contact (FIG. 2b), where the situation in which $2\phi=0$ is also permitted (FIG. 7c). When the double planar array configuration (FIG. 7b) is utilized, additional fibers 213a–213c are disposed to either side of fiber 204 in substantially the same plane as fiber 204.

FIG. 7d illustrates an end view and a side view of the fiber alignment block 702 in the packaging of the WDM in accordance with the present invention. Each one of the set 209a–209n of fibers is disposed within a respective one of the V-grooves 701a–701n. The fibers are securely held in place within the V-grooves by epoxy or other adhesive and/or by a pressure plate (not shown) such that at least one plane of fibers is parallel to the top face of the fiber alignment block 702. One end face 711 of the fiber alignment block 702 is cut at a 60° angle (that is, a 30° angle with respect to the parallel axes of the fibers of the set 205 of fibers) and the end faces of the fibers of set 209a–209n are disposed in alignment with the face 711. In operation, the end face 711 faces the grating block 300. A recess 712 is disposed at the opposite end of the fiber alignment block 702 from face 711 to provide strain relief for the fibers.

Figure 7E:
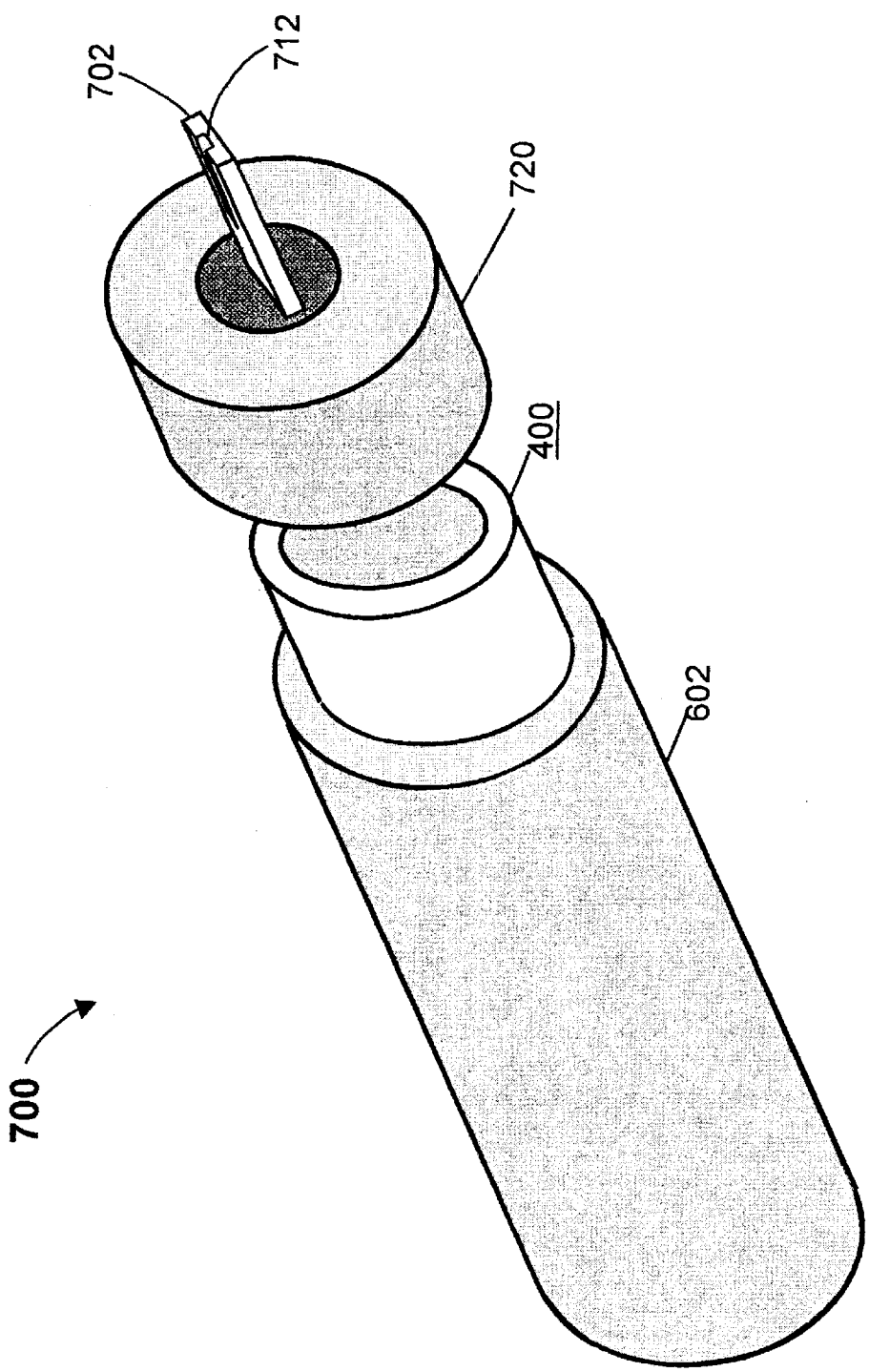
FIG. 7e illustrates a perspective view of the assembled packaging of the WDM in accordance with the present invention.

FIG. 7e illustrates a perspective view of the assembled packaging of the WDM in accordance with the present invention. It is to be understood that the grating block 300 is disposed within the outer protective tube or sleeve 602 as illustrated in greater detail in FIG. 6. Also, the set 205 of fibers (not shown) comprising fiber 204 and fibers 209a, 209b, etc. and, optionally, fiber 212 and fibers 213a, 213b, etc . . . , is secured to the fiber alignment block 702. The fiber alignment block 702 is positioned within an end cap 720 such that the angled face 711 of the block 702 and the ends of the fibers of set 205 face towards the grating block 300. The end cap 720 provides freedom for lateral and angular adjustment of the disposition of the plane of the top face of the fiber alignment block 702. During assembly, these adjustments are carried out so that the set 205 of fibers is in its optimal orientation with respect to the grating 302. Subsequent to such adjustments, the fiber alignment block 702 is secured to the end cap 720 by epoxy, solder, or other securing mechanism or adhesive and the end-cap 720 is secured to the sleeve 602. The final package is thereby hermetically sealed to protect the internal parts from environmental stresses or changes.

An improved packaging for a grating-based wavelength division multiplexer has been disclosed. A preferred embodiment of a packaging comprises a concave holographic reflection grating with an alignment surface, a first sleeve or cylinder with a three point mount for contacting the concave holographic reflecting grating and alignment surface, a pin or plate to align the alignment surfaces of the grating and the first sleeve or cylinder, and a second sleeve or cylinder with a spring-loaded holding mechanism in contact with the back side of the grating substrate. This packaging affords a quick, easy, precise and reproducible positioning and alignment of grating block. Thus, the wavelength division multiplexer is minimized in size while also reproducibly assembled with perfect alignment in a minimal amount of time.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A package for a wavelength division multiplexer (WDM), comprising:

a grating comprising an alignment surface;

a first sleeve comprising a mount, the mount capable of contacting the grating; and an alignment plate coupled to an outer surface of the first sleeve, wherein the alignment plate is contacting the alignment surface of the grating.

2. The package of claim 1, wherein the grating comprises a substrate plate, the substrate plate comprising:
   a concave holographic grating surface; and
   the alignment surface at an oblique angle to the grating surface.

3. The package of claim 2, wherein the substrate plate comprises a low-thermal-expansion substrate.

4. The package of claim 2, wherein the grating surface diffracts light such that the grating surface operates in a Littrow configuration.

5. The package of claim 2, wherein the grating surface comprises a reflective concave surface in a geometric form of a spherical cap.

6. The package of claim 5, wherein a grating axis of the grating surface is substantially perpendicular to a chord to the grating surface at a center of the spherical cap.

7. The package of claim 2, wherein the substrate plate further comprises:
   a back surface opposite to the grating surface, wherein the back surface is substantially flat and substantially perpendicular to a grating axis of the grating surface.

8. The package of claim 1, wherein the first sleeve comprises a low-thermal-expansion material.

9. The package of claim 1, wherein the first sleeve is cylindrical in cross-section.

10. The package of claim 1, wherein the first sleeve comprises:
    a slanted surface at an end of the first sleeve;
    the mount coupled to the slanted surface; and
    a slot on the outer surface of the first sleeve coupled to the alignment plate.

11. The package of claim 10, wherein the slanted surface is disposed at an angle such that an axis of the first sleeve is substantially parallel to a Littrow axis of the grating.

12. The package of claim 10, wherein the mount comprises a plurality of mounting pins.

13. The package of claim 1, further comprising:
    a second sleeve, wherein at least a portion of the grating, the first sleeve, and the alignment plate are capable of residing within the second sleeve.

14. The package of claim 13, wherein the second sleeve comprises:
    an open end;
    a sealed end opposite to the open end; and
    a holding mechanism coupled to the sealed end and residing within the second sleeve, wherein the holding mechanism is capable of applying force to the grating to place the grating into proper alignment with the mount and the alignment plate.

15. The package of claim 14, wherein the holding mechanism is spring-loaded.

16. The package of claim 13, further comprising:
    an end cap coupled to an open end of the second sleeve; and
    a fiber alignment block coupled to the end cap and optically coupled to the grating.

17. The package of claim 16, wherein the fiber alignment block comprises:
    a plurality of fibers;
    a plurality of grooves for holding the plurality of fibers;
    an angled end face facing the grating; and
    a recess at an end opposite to the angled end face.

18. A method for packaging a WDM, comprising the steps of:
    (a) providing a substrate plate, the substrate plate comprising:
       a grating surface, and
       an alignment surface at an oblique angle to the grating surface;
    (b) providing a first sleeve, the first sleeve comprising:
       an alignment plate at an outer surface of the first sleeve, and
       a mount coupled to an end of the first sleeve; and
    (c) coupling the substrate plate to the first sleeve, wherein the grating surface contacts the mount and the alignment surface contacts the alignment plate, wherein the grating surface has a desired alignment.

19. The method of claim 18, wherein the desired alignment allows the grating surface to diffract light such that the grating surface operates in a Littrow configuration.

20. The method of claim 18, further comprising:
    (d) placing the coupled substrate plate and first sleeve into a second sleeve.

21. The method of claim 20, further comprising:
    (e) engaging a back surface of the substrate plate with a holding mechanism, wherein the holding mechanism applies force to the back surface such that the grating surface and the first sleeve have the desired alignment.

22. The method of claim 21, further comprising:
    (f) coupling an end cap to the second sleeve, wherein the end cap comprises a plurality of fibers, wherein the plurality of fibers are optically coupled to the grating surface.

23. A package for a WDM, comprising:
    a substrate plate, comprising:
       a grating surface, and
       an alignment surface at an oblique angle to the grating surface;
    a first sleeve, comprising:
       a slanted surface at an end of the first sleeve,
       a mount capable of contacting the grating surface and coupled to the slanted surface, and
       a slot on an outer surface of the first sleeve; and
    an alignment plate coupled to the outer surface, wherein the alignment plate is contacting the alignment surface.

24. The package of claim 23, wherein the grating surface diffracts light such that the grating surface operates in a Littrow configuration.

25. The package of claim 23, wherein the grating surface comprises a reflective concave surface in a geometric form of a spherical cap.

26. The package of claim 25, wherein a grating axis of the grating surface is substantially perpendicular to a chord to the grating surface at a center of the spherical cap.

27. The package of claim 23, wherein the substrate plate further comprises:
    a back surface opposite to the grating surface, wherein the back surface is substantially flat and substantially perpendicular to a grating axis of the grating surface.

28. The package of claim 23, wherein the slanted surface is disposed at an angle such that an axis of the first sleeve is substantially parallel to a Littrow axis of the grating surface.

29. The package of claim 23, wherein the mount comprises a plurality of mounting pins.

30. The package of claim 23, further comprising:
    a second sleeve, wherein at least a portion of the substrate plate, the first sleeve, and the alignment plate are capable of residing within the second sleeve.

31. The package of claim 30, wherein the second sleeve comprises:

an open end;

a sealed end opposite to the open end; and a holding mechanism coupled to the sealed end and residing within the second sleeve, wherein the holding mechanism is capable of applying force to the substrate plate to place the grating surface into proper alignment with the mount and the alignment plate.

32. The package of claim 31, wherein the holding mechanism is spring-loaded.

33. The package of claim 31, further comprising:

an end cap coupled to an open end of the second sleeve; and a fiber alignment block coupled to the end cap and optically coupled to the grating.

34. The package of claim 33, wherein the fiber alignment block comprises:

a plurality of fibers;

a plurality of grooves for holding the plurality of fibers;

an angled end face facing the grating surface; and a recess at an end opposite to the angled end face.

35. A system, comprising:

a fiber optic transmission system; and a WDM optically coupled to the fiber optic transmission system, wherein a package of the WDM comprises:

a grating comprising an alignment surface;

a first sleeve comprising a mount, the mount capable of contacting the grating; and an alignment plate coupled to an outer surface of the first sleeve, wherein the alignment plate is contacting the alignment surface of the grating.

\* \* \* \* \*